(12) United States Patent
Breon et al.

(10) Patent No.: US 10,406,763 B2
(45) Date of Patent: Sep. 10, 2019

(54) ROTOR BLADE SPAR FORMATION WITH AUTOMATED FIBER PLACEMENT

(71) Applicant: Sikorsky Aircraft Corporation, Stratford, CT (US)

(72) Inventors: Joshua A. Breon, Lafayette, IN (US); Mario Dipreta, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 288 days.

(21) Appl. No.: 15/328,141

(22) PCT Filed: Aug. 10, 2015

(86) PCT No.: PCT/US2015/044465
§ 371 (c)(1),
(2) Date: Jan. 23, 2017

(87) PCT Pub. No.: WO2016/025386
PCT Pub. Date: Feb. 18, 2016

(65) Prior Publication Data
US 2017/0217107 A1 Aug. 3, 2017

Related U.S. Application Data

(60) Provisional application No. 62/037,642, filed on Aug. 15, 2014.

(51) Int. Cl.
*B29C 70/22* (2006.01)
*B29C 70/32* (2006.01)
(Continued)

(52) U.S. Cl.
CPC ............ *B29C 70/222* (2013.01); *B29C 70/32* (2013.01); *B29D 99/0028* (2013.01);
(Continued)

(58) Field of Classification Search
CPC ...... B29C 70/222; B29C 70/32; B64C 27/473; B64C 2027/4736; B29D 99/0028; B29K 2105/0881; B29L 2031/082
See application file for complete search history.

(56) References Cited

U.S. PATENT DOCUMENTS 4,273,601 A * 6/1981 Weingart .............. B29C 53/582
156/184
4,452,658 A * 6/1984 Schramm ................ B64C 27/46
156/245
(Continued)

FOREIGN PATENT DOCUMENTS

EP 2631062 A1 8/2013
EP 1663779 B1 10/2013

OTHER PUBLICATIONS

International Search Report and Written Opinion of the International Search Authority dated Oct. 30, 2015 in related PCT Application No. PCT/US15/044465, 9 pages.

*Primary Examiner* — Joseph J Dallo
(74) *Attorney, Agent, or Firm* — Cantor Colburn LLP

(57) ABSTRACT

A blade element is provided and includes courses of bias plies continuously machine-wrapped about leading and trailing edges at an angle relative to a long axis of the blade axis and unidirectional plies interwoven in parallel with the long axis between adjacent courses of the bias plies on upper and lower surfaces to promote respective tangential geometries of the bias plies at the leading and trailing edges, the unidirectional plies not extending into the leading and trailing edges.

15 Claims, 5 Drawing Sheets

(51) Int. Cl.
  *B29D 99/00* (2010.01)
  *B64C 27/473* (2006.01)
  *B29L 31/08* (2006.01)
  *B29K 105/08* (2006.01)

(52) U.S. Cl.
  CPC .... *B64C 27/473* (2013.01); *B29K 2105/0881* (2013.01); *B29L 2031/082* (2013.01); *B64C 2027/4736* (2013.01)

(56) References Cited

U.S. PATENT DOCUMENTS

| | | | |
|---|---|---|---|
| 4,621,980 A * | 11/1986 | Reavely | A01K 87/00 416/226 |
| 5,110,395 A | 5/1992 | Vaniglia | |
| 5,126,190 A * | 6/1992 | Sakatani | B29C 70/222 244/131 |
| 5,127,802 A | 7/1992 | Carlson et al. | |
| 5,222,297 A | 6/1993 | Graff et al. | |
| 5,248,242 A | 9/1993 | Lallo et al. | |
| 5,314,309 A * | 5/1994 | Blakeley | B29C 70/081 264/135 |
| 5,439,353 A | 8/1995 | Cook et al. | |
| 5,755,558 A * | 5/1998 | Reinfelder | B29C 70/446 416/230 |
| 5,939,007 A * | 8/1999 | Iszczyszyn | B29C 70/32 264/258 |
| 6,263,936 B1 | 7/2001 | Moore et al. | |
| 7,165,945 B2 | 1/2007 | Kovalsky et al. | |
| 7,247,003 B2 | 7/2007 | Burke et al. | |
| 8,114,329 B2 | 2/2012 | Karem | |
| 3,557,074 A1 | 10/2013 | McCowin | |
| 8,851,856 B2 * | 10/2014 | Vertel | B64C 3/187 416/233 |
| 8,876,483 B2 * | 11/2014 | Gruhn | B29B 11/16 416/230 |
| 9,896,186 B2 * | 2/2018 | Fong | B29C 70/222 |
| 10,137,542 B2 * | 11/2018 | Upton | B23P 15/04 |
| 2006/0278329 A1 | 12/2006 | Anderson et al. | |
| 2012/0045344 A1 | 2/2012 | Byrnes et al. | |
| 2013/0287584 A1 | 10/2013 | Nagle et al. | |
| 2017/0282413 A1* | 10/2017 | Breon | B29C 70/46 |

* cited by examiner

ROTOR BLADE SPAR FORMATION WITH AUTOMATED FIBER PLACEMENT

CROSS-REFERENCE TO RELATED APPLICATIONS

The present application is a 371 National Stage of International Application No. PCT/US2015/044465, filed on Aug. 10, 2015, which claims priority to U.S. Provisional Application No. 62/037,642, filed on Aug. 15, 2014, the contents of which are incorporated by reference herein in their entirety.

BACKGROUND OF THE INVENTION

The subject matter disclosed herein relates to rotor blade spar formation with automated fiber placement and, more particularly, to a method of rotor blade spar formation with automated fiber placement and pre-impregnated tows.

A rotor blade spar is a primary structural element of a helicopter rotor blade assembly inasmuch as its primary function is to transfer combined flapwise, edgewise, torsional and centrifugal loads to/from a central torque drive hub member. Typically, leading edge and trailing edge assemblies envelop the spar to yield a desired airfoil contour. The spar typically extends along the length of the rotor blade and is mounted at its inboard end to the hub member.

Fiber reinforced resin matrix composite materials are employed in the formation of the spar due to their tendencies to provide advantageous strength to weight ratios. Despite the inherent weight and strength advantages of these materials, however, widespread use of fiber reinforced resin matrix composite materials has been impeded by high costs and associated fabrication methods being difficult to execute.

As an example, conventional methods for manufacturing composite spars include filament winding and prepreg lay-up of composite materials. Although effective, these processes are relatively time and labor intensive. The prepreg lay-up process is primarily performed by hand and prepregs have little structural rigidity in their uncured state. The prepregs are hand-stacked and interleaved upon an inflatable mandrel assembly. The lay-up is then transferred into a matched metal mold and autoclave oven cured while the mandrel assembly is inflated to form the finished composite spar. Moreover, prepreg sheets are relatively expensive and require meticulous storage and handling processes which further increase manufacturing expense.

BRIEF DESCRIPTION OF THE INVENTION

According to one aspect of the invention, a blade element is provided and includes courses of bias plies continuously machine-wrapped about leading and trailing edges at an angle relative to a long axis of the blade axis and unidirectional plies interwoven in parallel with the long axis between adjacent courses of the bias plies on upper and lower surfaces to promote respective tangential geometries of the bias plies at the leading and trailing edges, the unidirectional plies not extending into the leading and trailing edges.

In accordance with additional or alternative embodiments, at least the bias plies include fibers suspended in an epoxy matrix.

In accordance with additional or alternative embodiments, the bias plies and the unidirectional plies cooperatively form a rotor blade spar.

In accordance with additional or alternative embodiments, the rotor blade spar has at least one or more of a race-track shaped elongated cross-sectional profile, an elliptical-shaped elongated cross-sectional profile and an airfoil-shaped elongated cross-sectional profile.

In accordance with additional or alternative embodiments, the bias plies include a plurality of offset bias plies being similarly positively angled relative to the long axis and an opposing ply being negatively angled with respect to the long axis.

In accordance with additional or alternative embodiments, the courses of the bias plies include a first course adjacent to an interior surface of the blade element, a second course adjacent to an exterior surface of the blade element and a third course radially interposed between the first and second courses.

In accordance with additional or alternative embodiments, the unidirectional plies include a first course of the unidirectional plies radially interposed between the first and third courses of the bias plies and a second course of the unidirectional plies radially interposed between the third and second courses of the bias plies.

In accordance with additional or alternative embodiments, the first and second courses of unidirectional plies are formed with drop-offs supporting the respective tangential geometries of the bias plies.

According to another aspect of the invention, a method of forming a blade element is provided and includes rotating a mandrel about a long axis thereof, continuously machine-wrapping bias plies about leading and trailing edges of the mandrel at an angle with respect to the long axis during the rotating to form courses of the bias plies and interweaving unidirectional plies in parallel with the long axis between adjacent courses of the bias plies on upper and lower surfaces of the mandrel to promote respective tangential geometries of the bias plies at the leading and trailing edges.

In accordance with additional or alternative embodiments, at least the bias plies include fibers suspended in an epoxy matrix and the method further includes executing a curing process.

In accordance with additional or alternative embodiments, the continuously machine-wrapping of the bias plies includes positively angling a plurality of offset bias plies relative to the long axis and negatively angling an opposing ply respect to the long axis.

In accordance with additional or alternative embodiments, the continuously machine-wrapping of the bias plies includes forming a first course adjacent to the mandrel, forming a second course remote from the mandrel and forming a third course radially interposed between the first and second courses and the interweaving of the unidirectional plies includes radially interposing a first course between the first and third courses of the bias plies and radially interposing a second course between the third and second courses of the bias plies.

In accordance with additional or alternative embodiments, the continuously machine-wrapping and the interweaving are repeated for multiple iterations.

In accordance with additional or alternative embodiments, the radial interposing of the first and second courses of the unidirectional plies includes forming base ply tangential geometry supporting drop-offs.

In accordance with additional or alternative embodiments, the method further includes removing the mandrel from the blade element to form a blade spar.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

In order to overcome the above-noted drawbacks of conventional methods for manufacturing composite spars, automated fiber placement processes have been developed. These involve tows of preimpregnated or dry filaments being wound about a mandrel assembly where the mandrel assembly is of a shape generally corresponding to the required shape of the finished article. The mandrel assembly typically includes a rigid substructure and a bladder disposed over the rigid substructure. The preimpregnated courses (multiple tows) are placed over the mandrel while the mandrel and fibers are reciprocally displaced relative to one another along the longitudinal or winding axis of the mandrel to build a plurality of layers of preimpregnated material. Upon completion of the automated fiber placement process, the mandrel with material lay-up is placed in a matched metal mold and cured while the bladder is pressurized to urge the fibers against the matched metal mold.

Difficulties have been experienced, however, when the fibers are expanded against the matched metal mold. As the fibers are initially wound laterally about the mandrel under tension, pressurization sufficient to achieve proper laminate compaction may be difficult to achieve. Should the fibers resist complete and uniform compaction as a result, the composite article may become resin-rich or resin-starved in particular areas resulting in poor laminate quality. In the case of an elliptically shaped composite article, the conic regions, i.e., the leading and trailing edges of the spar, may be vulnerable to variations in fiber volume.

Accordingly, a method for efficient structural formation of a composite spar is provided. The method locates the fibers in a particular orientation, minimizes weight and increases damage tolerance. Furthermore, the method employs processes that are relatively inexpensive and are associated with reduced labor and permits ease of material handling yet maintains exacting quality standards during assembly.

Figure 1:
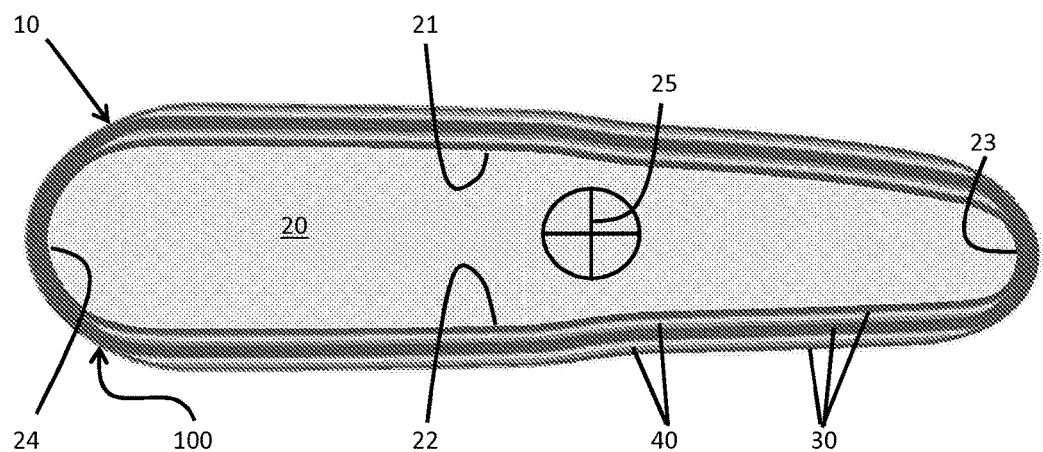
FIG. 1 is an axial view of a cross-section of a completed blade element in accordance with embodiments.
Figure 2:
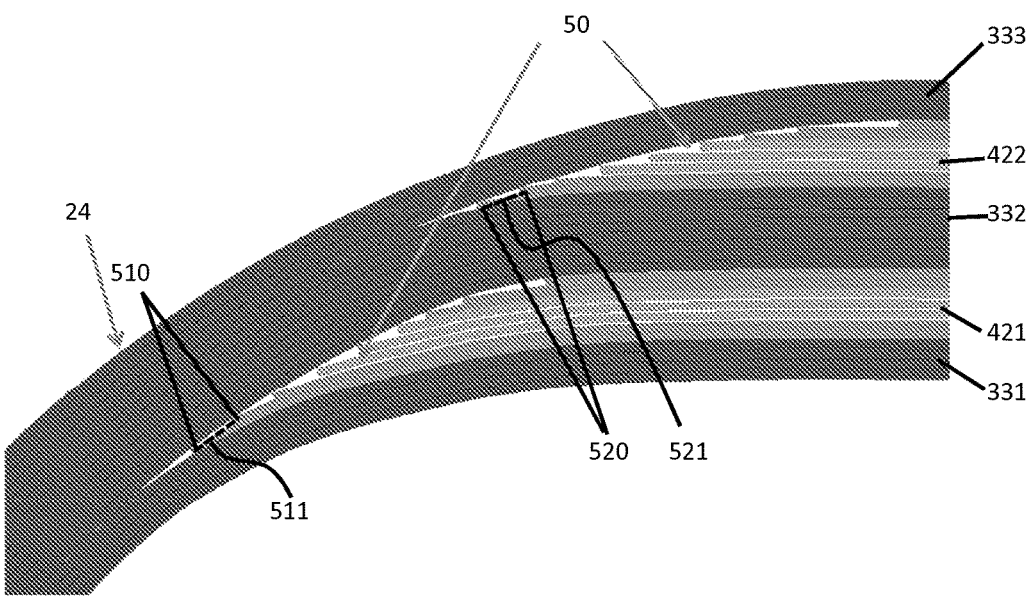
FIG. 2 is an enlarged view of a portion of the cross-section of FIG. 1.
Figure 3:
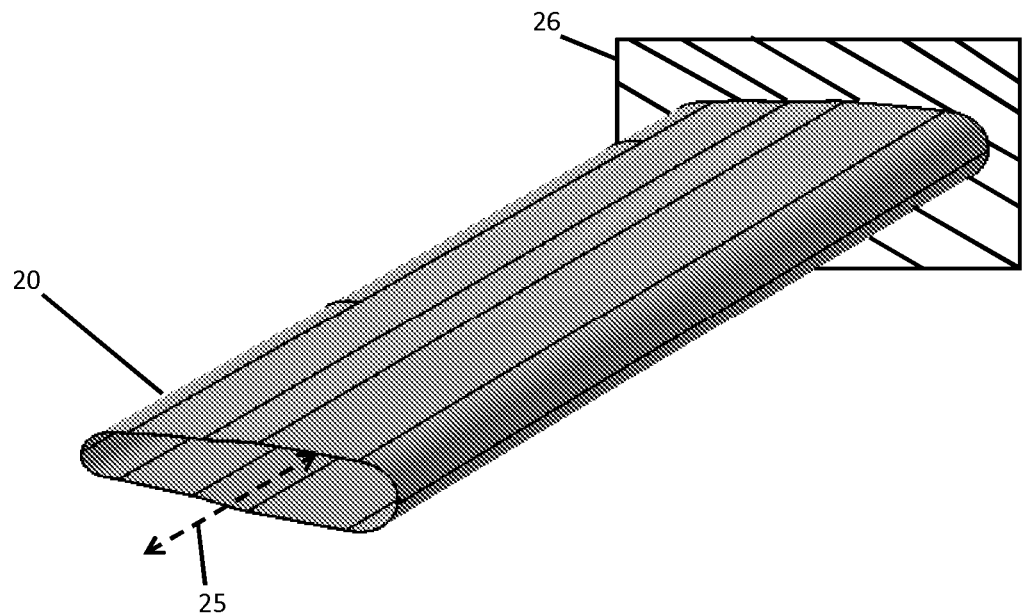
FIG. 3 is a perspective view of a mandrel of a blade element in accordance with embodiments.
Figure 8:
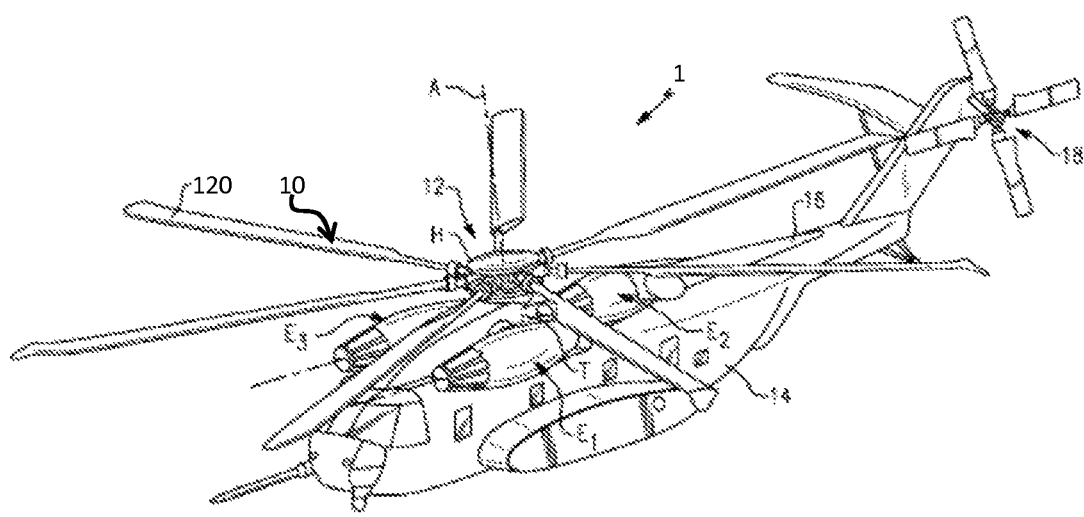
FIG. 8 is view of a helicopter including the blade element of FIG. 1 according to an aspect of the invention.

With reference to FIGS. 1 and 2, a blade element 10 is provided and may be configured for example as a helicopter blade spar (see FIG. 8). The blade element 10 includes a substantially rigid mandrel 20, bias plies 30 and unidirectional plies 40. The mandrel 20 may be shaped in a similar fashion as a desired final shape of the blade element 10 and has an upper surface 21 and a lower surface 22 as well as leading and trailing edges 23 and 24 defined where the upper and lower surfaces 21 and 22 are joined to one another along a long axis 25 of the mandrel 20. In accordance with embodiments, a cross-section of the mandrel 20 may be aerodynamic or otherwise provided with a reduced drag shape. In some cases, the cross-section of the mandrel 20 may be airfoil-shaped with the upper surface 21 formed as a suction surface and the lower surface 22 formed as a pressure surface. Once constructed, the mandrel 20 is removed to reveal the blade element 10 usable in the blade spar.

At least the bias plies 30 may be formed of fibrous materials suspended within an epoxy matrix. The unidirectional plies 40 may be formed of similar materials. In any case, the various bias plies 30 may be formed of similar materials as one another or of differing materials and the unidirectional plies 40 may be formed of similar materials as one another or of differing materials. The bias plies 30 include plies 31, 32 which are continuously machine-wrapped about the leading and trailing edges 23 and 24 of the mandrel 20 at a (positive or negative) angle α (see FIG. 4) relative to the long axis 25. The unidirectional plies 40 are interwoven in parallel with the long axis 25 among the bias plies 30 on the upper and lower surfaces 21 and 22. The configuration of the unidirectional plies 40 serves to promote respective tangential 2D conic geometries of the bias plies 30 at the leading and trailing edges 23 and 24.

The continuous machine-wrapping of the bias plies 30 and the interweaving of the unidirectional plies 40 may be repeated for multiple iterations as needed.

When assembled or formed together, as noted above, the mandrel 20, the bias plies 30 and the unidirectional plies 40 may cooperatively form a rotor blade spar. As shown in FIGS. 1 and 2, the resulting rotor blade spar may have at least one or more of a race-track shaped elongated cross-sectional profile 100, an elliptical-shaped elongated cross-sectional profile and an airfoil-shaped elongated cross-sectional profile.

Figure 4:
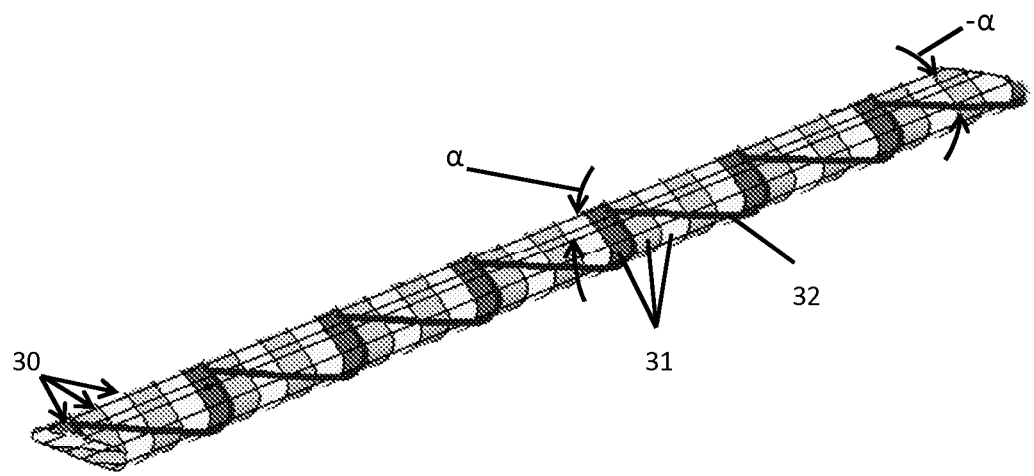
FIG. 4 is a perspective view of bias plies continuously machine-wrapped onto the mandrel of FIG. 3.
Figure 5:
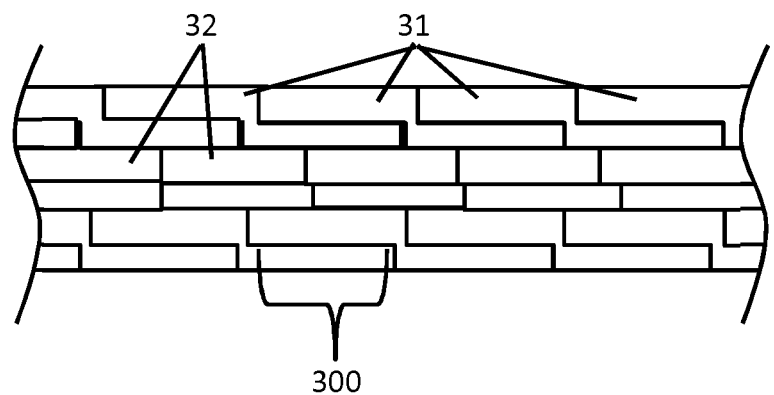
FIG. 5 is an enlarged axial view of the bias plies of FIG. 4.

With continued reference to FIGS. 1 and 2 and with additional reference to FIGS. 3-6, additional details of the blade element 10 as well as a method of forming the blade element 10 will be described below. As shown in FIGS. 4 and 5, the bias plies 30 may include a plurality of offset bias plies 31 and an opposing ply 32. The offset bias plies 31 are each similarly positively angled relative to the long axis 25 and partially overlap with one another in the axial direction along overlaps 300 (i.e., along the long axis 25) to be axially offset from one another. The opposing ply 32 is negatively angled with respect to the long axis 25. It will be understood that the positive angling of the offset bias plies 31 can be but does not have to be equal for each of the bias plies 31 and that the absolute value of the positive and negative angling of the bias plies 31 and the opposing ply 32 also can be does not have to be equal.

Figure 6:
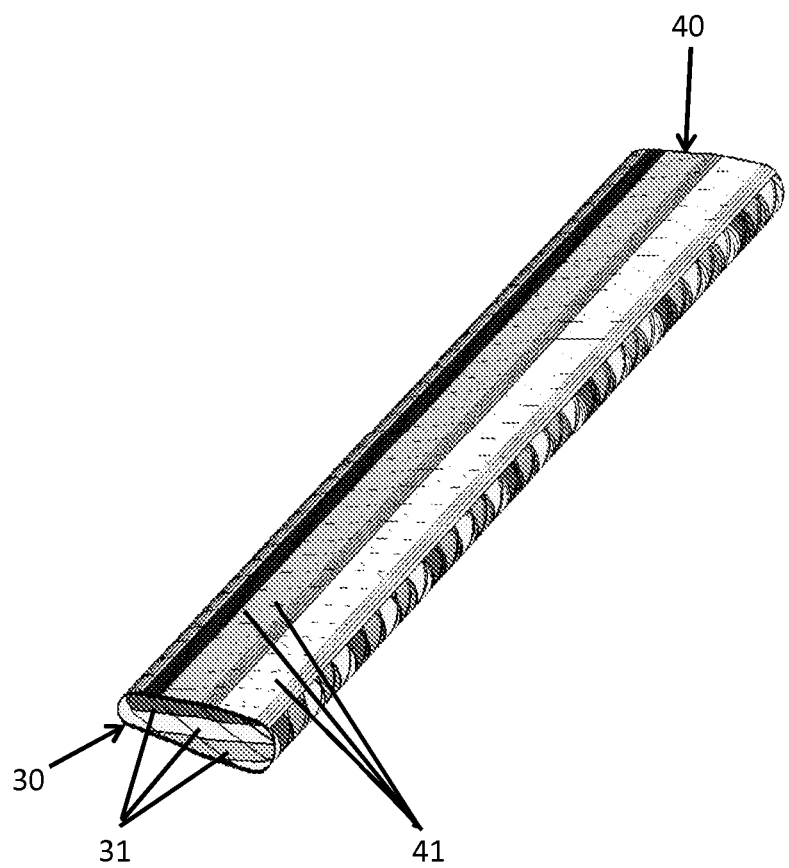
FIG. 6 is a perspective view of unidirectional plies woven onto the bias plies of FIG. 4.

As shown in FIG. 5, the offset bias plies 31 and the opposing ply 32 may be layered multiple times with each successive layer angled with respect to the adjacent layers, reversely angled with respect to adjacent layers and/or offset from the adjacent layers. As shown in FIG. 6, the unidirectional plies 40 may include a plurality of plies 41 layered on top of one another at the upper and lower surfaces 21 and 22. Each one of the plurality of plies 41 is oriented in parallel with the long axis 25 (i.e., they are each zero-angled). As with the bias plies 30, the unidirectional plies 40 may be layered multiple times with each successive layer formed slightly differently from the adjacent layers, as will be discussed below.

The multiple layers of the bias plies 30, including the offset bias plies 31 and the opposing ply 32 in each successive layer, cooperatively form courses 331, 332, 333 of bias plies 30 extending around at least the leading and trailing edges 23 and 24 of the mandrel 20. In a similar manner, the multiple layers of the unidirectional plies 40 cooperatively form courses 421, 422 of unidirectional plies 40 at the upper and lower surfaces 21 and 22. In accordance with embodiments and, as shown in FIG. 2, the multiple layers of the bias plies 30 may cooperatively form for example at least a first course 331, which lies adjacent to the mandrel 20 and is thus reflective of an overall cross-sectional shape of the mandrel 20, a second course 332, which is remote from the mandrel 20, and a third course 333. The third course 333 is radially interposed between the first and second courses 331 and 332. In accordance with further embodiments, the multiple layers of the unidirectional plies 40 may cooperatively form a first course 421, which is radially interposed between the first and third courses 331 and 333 of the bias plies 30, and a second course 422, which is radially interposed between the third and second courses 333 and 332 of the bias plies 30. There is no limit as to how many layers of the unidirectional plies 40 that can be used.

With this configuration, as shown in FIG. 2, the innermost layer of the unidirectional plies 40 of the first course 421 lies atop the outermost layer of the bias plies 30 of the first course 331 along the upper and lower surfaces 21 and 22, the innermost layer of the bias plies 30 of the second course 332 lies atop the outermost layer of the unidirectional plies 40 of the first course 421 along the upper and lower surfaces 21 and 22, the innermost layer of the unidirectional plies 40 of the second course 422 lies atop the outermost layer of the bias plies 30 of the second course 332 along the upper and lower surfaces 21 and 22 and the innermost layer of the bias plies 30 of the third course 333 lies atop the outermost layer of the unidirectional plies 40 of the second course 422 along the upper and lower surfaces 21 and 22. By contrast, since the unidirectional plies 40 do not extend around the leading and trailing edges 23 and 24, the first, second and third courses 331, 332 and 333 of the bias plies are adjacent to and connected to one another.

At transitions between the upper and lower surfaces 21 and 22, the innermost layer of the bias plies 30 of the second course 332 extends tangentially toward and then atop the outermost layer of the bias plies 30 of the first course 331 while the innermost layer of the bias plies 30 of the third course 333 extends tangentially toward and then atop the outermost layer of the bias plies 30 of the second course 332. This tangential geometry 50 is supported by successive drop-offs 51 of the first and second courses 421 and 422 of the unidirectional plies 40 being slightly offset from one another toward the upper and lower surfaces 21 and 22 with increasing radial distance from the mandrel 20.

That is, as shown in FIG. 2, the innermost layer of the unidirectional plies 40 of the first course 421 extends substantially to the trailing edge 22 while the next-innermost layer of the unidirectional plies 40 of the first course 421 extends just short of the extent of the innermost layer of the unidirectional plies 40 of the first course 421. Thus, the respective layer drop-offs 510 of the innermost and next-innermost layers of the unidirectional plies 40 of the first course 421 are separated from one another by a tangential distance 511 and the innermost layer of the bias plies 30 of the second course 332 runs along the edges of the layer drop-offs 510.

Similarly, the innermost layer of the unidirectional plies 40 of the second course 422 extends substantially to the trailing edge 22 while the next-innermost layer of the unidirectional plies 40 of the second course 422 extends just short of the extent of the innermost layer of the unidirectional plies 40 of the second course 422. Thus, the respective layer drop-offs 520 of the innermost and next-innermost layers of the unidirectional plies 40 of the second course 422 are separated from one another by a tangential distance 521 and the innermost layer of the bias plies 30 of the third course 333 runs along the edges of the layer drop-offs 520.

Figure 7:
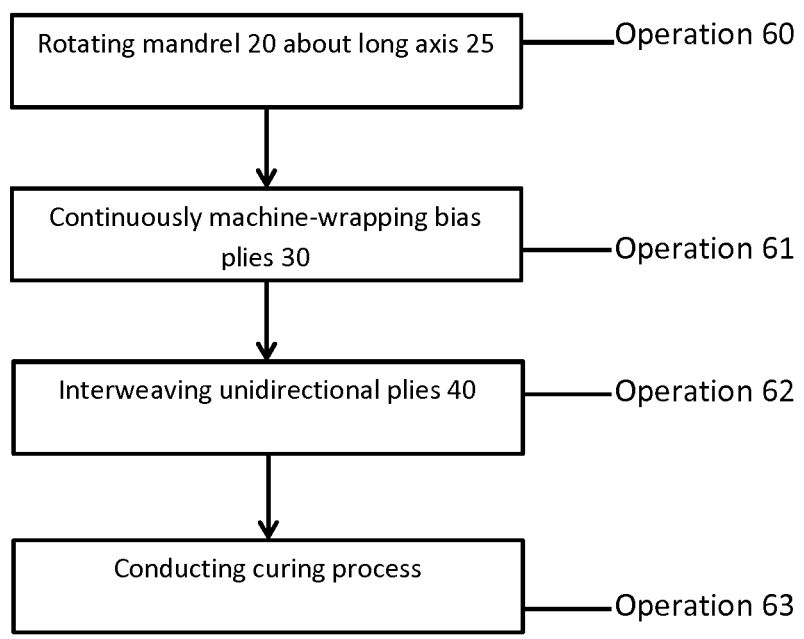
FIG. 7 is a flow diagram illustrating a method of forming a blade element.

With continued reference to FIGS. 1-6 and, with additional reference to FIG. 7, a method of forming a blade element is provided and includes placing the mandrel 20 in or on a jig of a head-tail stock machine 26 (see FIG. 3) and using the stock machine 26 to rotate the mandrel 20 about the long axis 25 (operation 60). The method further includes continuously machine-wrapping the bias plies 30 about at least the leading and trailing edges 23 and 34 of the mandrel 20 at the angle α with respect to the long axis 25 during the rotating (operation 61) and interweaving the unidirectional plies 40 in parallel with the long axis 25 among the bias plies 30 on the upper and lower surfaces 21 and 22 of the mandrel 20 to promote the respective tangential geometries 50 of the bias plies 30 at the leading and trailing edges 23 and 24 (operation 62). Once the bias plies 30 and the unidirectional plies 40, the epoxy matrix of at least the bias plies 30 may be cured via heat/ultraviolet (UV) exposure processes (operation 62).

The continuously machine-wrapping of the bias plies 30 of operation 61 includes spooling each of the bias plies 30 off of a spool (not shown) with the spool being moved along the longitudinal axis 25 during the rotating of the mandrel 20 and with the spool being pulled against the mandrel 20 to achieve a desired tension in the bias plies 30. For the offset bias plies 31, the spool may be disposed at a leading position relative to each offset bias ply 31 to achieve the positive angling of the offset bias ply 31 relative to the long axis 25. By contrast, for the opposing ply 32, the spool may be disposed at a trailing position to achieve the negative angling of the opposing ply 32.

FIG. 8 schematically illustrates a rotary-wing aircraft 1 having a main rotor system 12. The aircraft 1 includes an airframe 14 having an extending tail 16 which mounts a tail rotor system 18, such as an anti-torque system. The main rotor assembly 12 is driven about an axis of rotation A through a main gearbox (illustrated schematically at T) by one or more engines E. The main rotor system 12 includes multiple rotor blade assemblies 120, which use the blade element 10 and which are mounted to a rotor hub assembly H. Although a particular helicopter configuration is illustrated and described in the disclosed non-limiting embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from the present invention.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. By way of example, aspects can be used for blade elements used in maritime applications, wind turbines, building construction materials, automotive parts, etc. Accordingly, the invention is not to be seen as limited by the foregoing description, but is only limited by the scope of the appended claims.

What is claimed is:

1. A blade element, comprising:
   courses of bias plies formed from a plurality of filaments continuously machine-wrapped about leading and trailing edges at an angle relative to a long axis of the blade axis; and
   unidirectional plies interwoven in parallel with the long axis between adjacent courses of the bias plies on upper and lower surfaces to promote respective tangential geometries of the bias plies at the leading and trailing edges, the unidirectional plies not extending into the leading and trailing edges.

2. The blade element according to claim 1, wherein at least the bias plies comprise fibers suspended in an epoxy matrix.

3. The blade element according to claim 1, wherein the bias plies and the unidirectional plies cooperatively form a rotor blade spar.

4. The blade element according to claim 3, wherein the rotor blade spar has at least one or more of a race-track shaped elongated cross-sectional profile, an elliptical-shaped elongated cross-sectional profile and an airfoil-shaped elongated cross-sectional profile.

5. The blade element according to claim 1, wherein the bias plies comprise:
   a plurality of offset bias plies being similarly positively angled relative to the long axis; and
   an opposing ply being negatively angled with respect to the long axis.

6. The blade element according to claim 1, wherein the courses of the bias plies comprise:
   a first course adjacent to an interior surface of the blade element;
   a second course adjacent to an exterior surface of the blade element; and
   a third course radially interposed between the first and second courses.

7. The blade element according to claim 6, wherein the unidirectional plies comprise:
   a first course of the unidirectional plies radially interposed between the first and third courses of the bias plies; and
   a second course of the unidirectional plies radially interposed between the third and second courses of the bias plies.

8. The blade element according to claim 7, wherein the first and second courses of unidirectional plies are formed with drop-offs supporting the respective tangential geometries of the bias plies.

9. A method of forming a blade element, the method comprising:
   rotating a mandrel about a long axis thereof;
   continuously machine-wrapping bias plies formed from a plurality of filaments about leading and trailing edges of the mandrel at an angle with respect to the long axis during the rotating to form courses of the bias plies; and
   interweaving unidirectional plies in parallel with the long axis between adjacent courses of the bias plies on upper and lower surfaces of the mandrel to promote respective tangential geometries of the bias plies at the leading and trailing edges.

10. The method according to claim 9, wherein at least the bias plies comprise fibers suspended in an epoxy matrix and the method further comprises executing a curing process.

11. The method according to claim 9, wherein the continuously machine-wrapping of the bias plies comprises:
    positively angling a plurality of offset bias plies relative to the long axis; and
    negatively angling an opposing ply respect to the long axis.

12. The method according to claim 9, wherein the continuously machine-wrapping of the bias plies comprises:
    forming a first course adjacent to the mandrel;
    forming a second course remote from the mandrel; and
    forming a third course radially interposed between the first and second courses, and the interweaving of the unidirectional plies comprises:
    radially interposing a first course between the first and third courses of the bias plies; and
    radially interposing a second course between the third and second courses of the bias plies.

13. The method according to claim 12, wherein the continuously machine-wrapping and the interweaving are repeated for multiple iterations.

14. The method according to claim 12, wherein the radial interposing of the first and second courses of the unidirectional plies comprises forming base ply tangential geometry supporting drop-offs.

15. The method according to claim 9, further comprising removing the mandrel from the blade element to form a blade spar.

* * * * *